US012492564B2

(12) United States Patent
Branham

(10) Patent No.: US 12,492,564 B2
(45) Date of Patent: Dec. 9, 2025

(54) ACCESS PANEL WITH MOUNTING TABS

(71) Applicant: Ascent Holdings, LLC, Gig Harbor, WA (US)

(72) Inventor: Tony J. Branham, Gig Harbor, WA (US)

(73) Assignee: Ascent Holdings, LLC, Gig Harbor, WA (US)

(*) Notice: Subject to any disclaimer, the term of this patent is extended or adjusted under 35 U.S.C. 154(b) by 0 days.

(21) Appl. No.: 18/633,198

(22) Filed: Apr. 11, 2024

(65) Prior Publication Data

US 2024/0352785 A1 Oct. 24, 2024

Related U.S. Application Data

(60) Provisional application No. 63/497,918, filed on Apr. 24, 2023.

(51) Int. Cl.
*E04F 19/08* (2006.01)
*E06B 1/60* (2006.01)

(52) U.S. Cl.
CPC .......... *E04F 19/083* (2013.01); *E06B 1/6061* (2013.01)

(58) Field of Classification Search
CPC ............................. E04F 19/083; E06B 1/6061
See application file for complete search history.

(56) References Cited

U.S. PATENT DOCUMENTS 2,766,856 A * 10/1956 Nels ........................ E04F 19/08 16/257
3,491,486 A * 1/1970 Caruth .................... E04F 19/08 49/463
3,930,338 A * 1/1976 Rood ...................... E04B 9/003 52/506.06
4,593,493 A * 6/1986 Naka ....................... E04F 19/08 49/248
4,673,235 A * 6/1987 Conley .................. H02G 3/123 220/3.6
4,679,365 A * 7/1987 Herring ..................... E06B 5/00 52/211
4,955,825 A * 9/1990 Groth ..................... H02G 3/123 439/538
5,211,580 A * 5/1993 Schuplin ................ H02G 3/123 439/538

(Continued)

FOREIGN PATENT DOCUMENTS

BR 202019017849 U2 * 12/2020 ............. E04B 9/003
DE 20104472 U1 * 6/2001 ............ E04F 19/083

(Continued)

*Primary Examiner* — Catherine A Kelly
(74) *Attorney, Agent, or Firm* — Seed Intellectual Property Law Group LLP

(57) ABSTRACT

An assembly for covering an opening in a structural member, the assembly having a frame with at least two orifices formed in the frame, a cover structured for attachment to the frame, and at least two mounting members capable of being attached to the frame, each mounting member having a first end structured to be received in a respective orifice in the frame, each mounting member formed of a bendable material that enables a second end of the mounting member to bend at least 90 degrees to a bent shape and to retain the bent shape to enable attachment of the assembly to the structural member without the use of typical fasteners.

17 Claims, 5 Drawing Sheets

(56) References Cited

U.S. PATENT DOCUMENTS 5,327,682 A * 7/1994 Holtz ..................... E05D 9/005
16/361
5,355,626 A * 10/1994 Sachs ..................... E04F 19/08
49/436
5,538,293 A * 7/1996 Kolt .................... F24F 13/0209
285/24
6,314,691 B1 * 11/2001 Takagi .................. E04F 19/083
52/762
6,557,956 B2 * 5/2003 Hightower ............ E04F 19/083
24/297
6,848,226 B1 * 2/2005 Boyd ...................... E04F 19/08
52/220.8
6,931,794 B1 * 8/2005 Burgess ................ E04F 19/083
52/95
8,813,426 B2 * 8/2014 Chwala ............... F24F 13/0263
49/465
8,985,364 B2 * 3/2015 Gagne .................... H02G 3/123
52/656.1
9,591,390 B2 * 3/2017 Humphreys ........... H04R 1/021
10,267,050 B2 * 4/2019 De Dominico ........... E06B 9/00
10,281,120 B1 * 5/2019 Winslett ............... F16M 13/022
10,302,115 B2 * 5/2019 Bickers .............. A47B 96/1458
10,502,447 B2 12/2019 Branham
10,794,069 B2 * 10/2020 Gill ........................ E06B 1/6007
10,871,025 B2 * 12/2020 Gill ........................... E06B 1/52
11,015,822 B2 5/2021 Branham
12,123,455 B2 * 10/2024 Clark ...................... F16B 2/241
2010/0050533 A1 * 3/2010 Klapishevskyy ..... E04F 19/083
49/400
2016/0017567 A1 * 1/2016 Wise ................... E02D 29/1427
49/506
2019/0127971 A1 * 5/2019 Stauffer ................ E04B 1/4178
2020/0109737 A1 * 4/2020 Outlaw ................. F16B 43/009

FOREIGN PATENT DOCUMENTS

EP 1961891 A1 * 8/2008 ............ E04F 19/083
GB 2506738 A * 4/2014 ............. E04B 9/003
GB 2580742 A * 7/2020 ............. E04B 9/003
KR 20140053043 A * 5/2014

* cited by examiner

ACCESS PANEL WITH MOUNTING TABS

BACKGROUND

Technical Field

The present disclosure is directed to devices for providing access to openings and covers for the same and, more particularly, to a frame for an access cover that includes adjustable mounting members to enable attachment without fasteners to the access opening.

Description of the Related Art

Applicant's prior U.S. Pat. No. 10,502,447 entitled Ventilation Fan Housing and Mounting System describes the use of integrally formed bendable tabs on a metal fan housing for mounting the housing in a ceiling opening. Applicant's prior U.S. Pat. No. 11,015,822 entitled Ventilation Fan Mounting Assembly discloses an additional structure in the form of a trim ring and cover that are positioned over the ceiling opening to conceal the ventilation fan housing after installation. The mounting assembly trim ring is made of plastic material and is press fit into the ceiling opening, and the cover is then positioned against the trim ring and attached to the ventilation fan housing with spring clips. In this assembly, the cover holds the trim ring in positive engagement against the ceiling.

Neither of these prior patents address the issue of positively engaging the trim ring with the ceiling opening without the use of a cover that is attached to the ventilation fan housing.

BRIEF SUMMARY

The present disclosure is directed to an access cover assembly having bendable mounting tabs for attaching the assembly to an opening in a structure, such as a wall or ceiling, and holding the assembly in place without the use of traditional fasteners such as screws, nails, and the like.

In accordance with one aspect of the present disclosure, an assembly for covering an opening in a structural member is provided. The assembly includes a frame having at least two orifices formed in the frame, a cover structured for attachment to the frame, and at least two mounting members capable of being attached to the frame, each mounting member having a first end structured to be received in a respective orifice in the frame, each mounting member formed of a bendable material that enables a second end of the mounting member to bend at least 90 degrees to a bent shape and to retain the bent shape.

In accordance with another aspect of the present disclosure, the at least two mounting members are formed of a metal material.

In accordance with yet another aspect of the present disclosure, the frame and the cover are each formed a metal material, or the frame and the cover are each formed from a non-metal material.

In accordance with a further aspect of the present disclosure, each mounting member of the at least two mounting members has a bayonet formed on the first end to retain the at least two mounting members in engagement with the orifice in the frame.

In accordance with still yet another aspect of the present disclosure, each mounting member of the at least two mounting members is press fit into the respective orifice in the frame.

In accordance with another aspect of the present disclosure, the first end of each of the at least two mounting members includes a bayonet structured to retain the mounting member in engagement with the respective orifice in the frame.

BRIEF DESCRIPTION OF THE SEVERAL VIEWS OF THE DRAWINGS

The foregoing features and advantages of the present disclosure will be more readily appreciated as the same become better understood from the following detailed description when taken in conjunction with the accompanying drawings, wherein.

DETAILED DESCRIPTION

In the following description, certain specific details are set forth in order to provide a thorough understanding of various disclosed implementations. However, one skilled in the relevant art will recognize that implementations may be practiced without one or more of these specific details, or with other methods, components, materials, etc. In other instances, well-known structures or components or both associated with the manufacture and installation of access openings, including walls, ceilings, floors, decks, bulkheads, as well as ventilation conduits, ducting, and related fans and structural members associated therewith have not been shown or described in order to avoid unnecessarily obscuring descriptions of the representative implementations herein below.

Unless the context requires otherwise, throughout the specification and claims that follow, the word "comprise" and variations thereof, such as "comprises" and "comprising" are to be construed in an open inclusive sense, that is, as "including, but not limited to." The foregoing applies equally to the words "including" and "having."

Reference throughout this description to "one implementation" or "an implementation" means that a particular feature, structure, or characteristic described in connection with the implementation is included in at least one implementation. Thus, the appearance of the phrases "in one implementation" or "in an implementation" in various places throughout the specification are not necessarily all referring to the same implementation. Furthermore, the particular features, structures, or characteristics may be combined in any suitable manner in one or more implementations.

The various implementations described above can be combined to provide further implementations. Aspects of the implementations can be modified, if necessary to employ concepts of the various patents, applications and publications to provide yet further implementations.

These and other changes can be made to the implementations in light of the above-detailed description. In general, in the following claims, the terms used should not be construed to limit the claims to the specific implementations disclosed in the specification and the claims, but should be construed to include all possible implementations along with the full scope of equivalents to which such claims are entitled. Accordingly, the claims are not limited by the disclosure.

Figure 1:
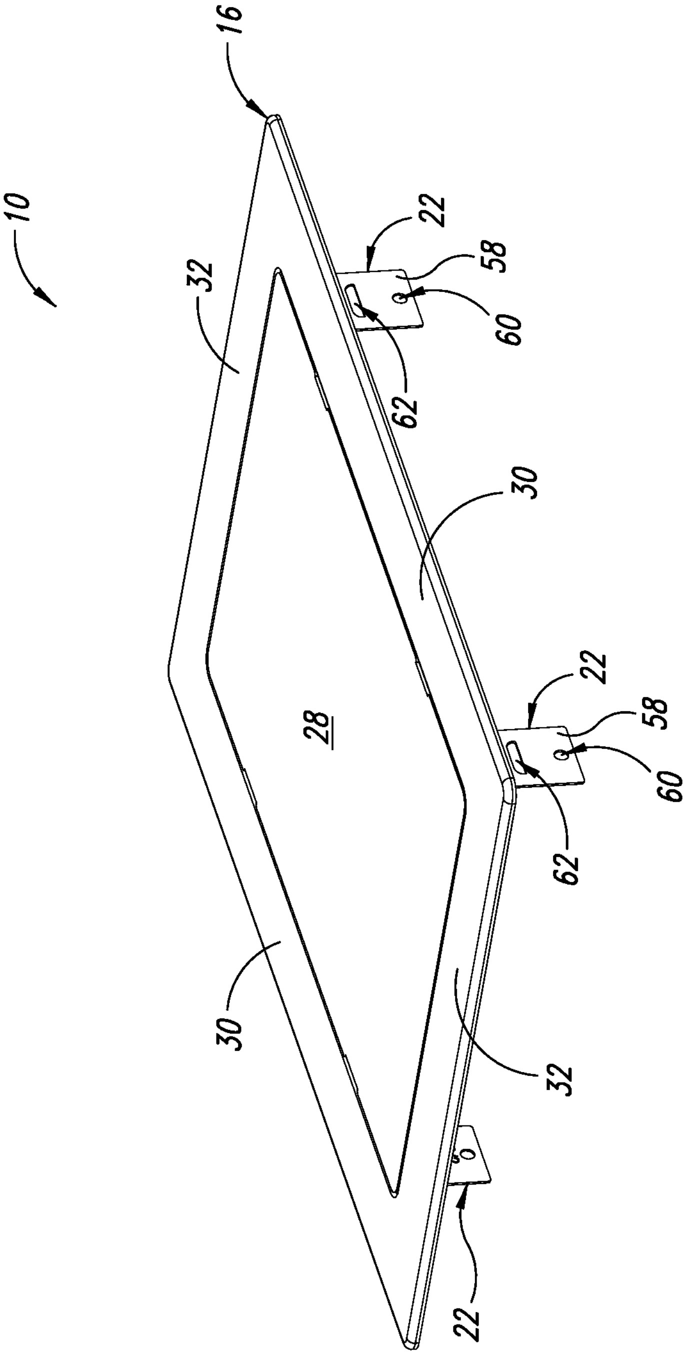
FIG. 1 is an illustration of an assembly for covering an opening in a structural member formed in accordance with the present disclosure.
Figure 2:
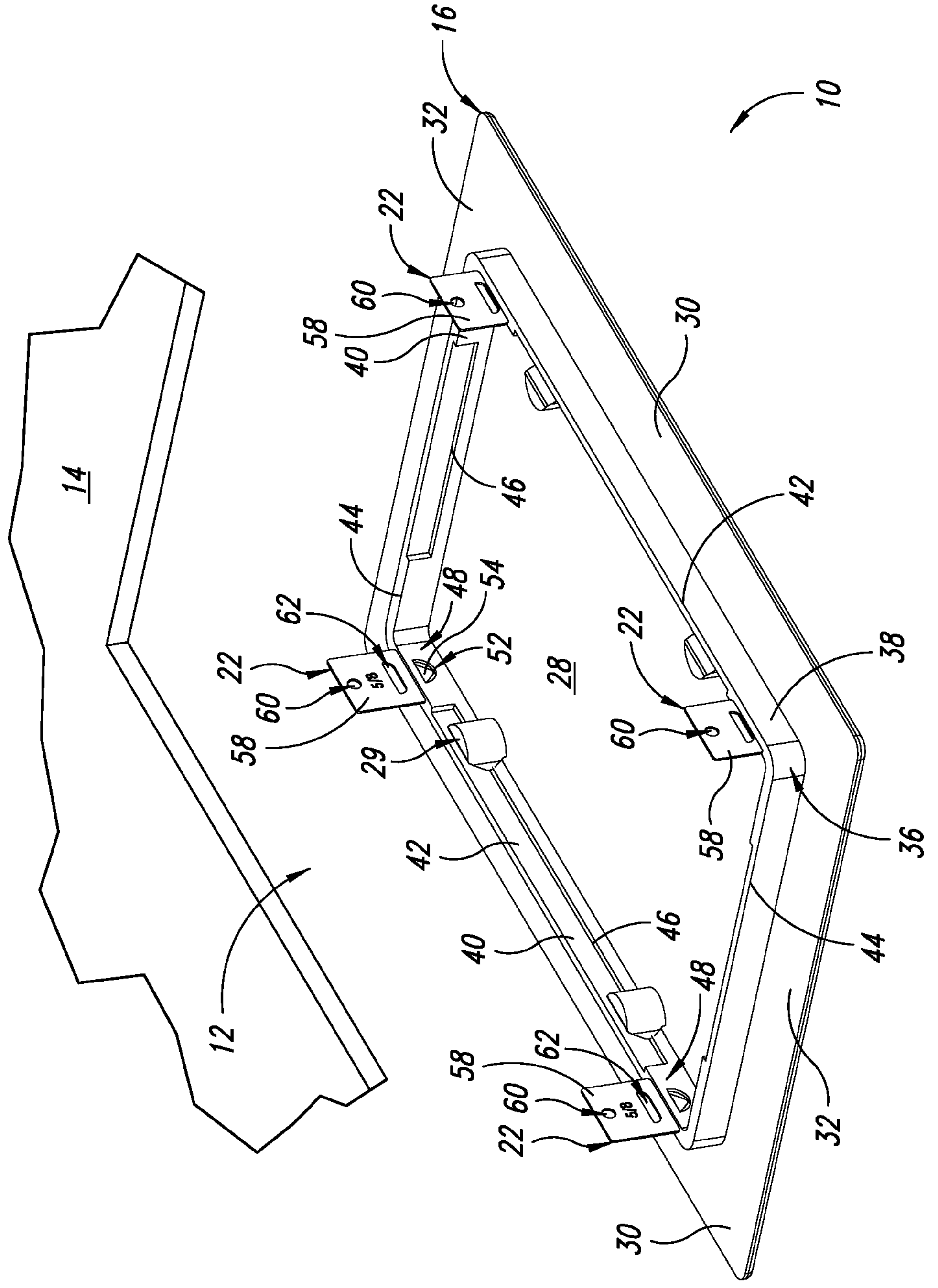
FIG. 2 is an illustration of a reverse side of the assembly of FIG. 1.
Figure 3:
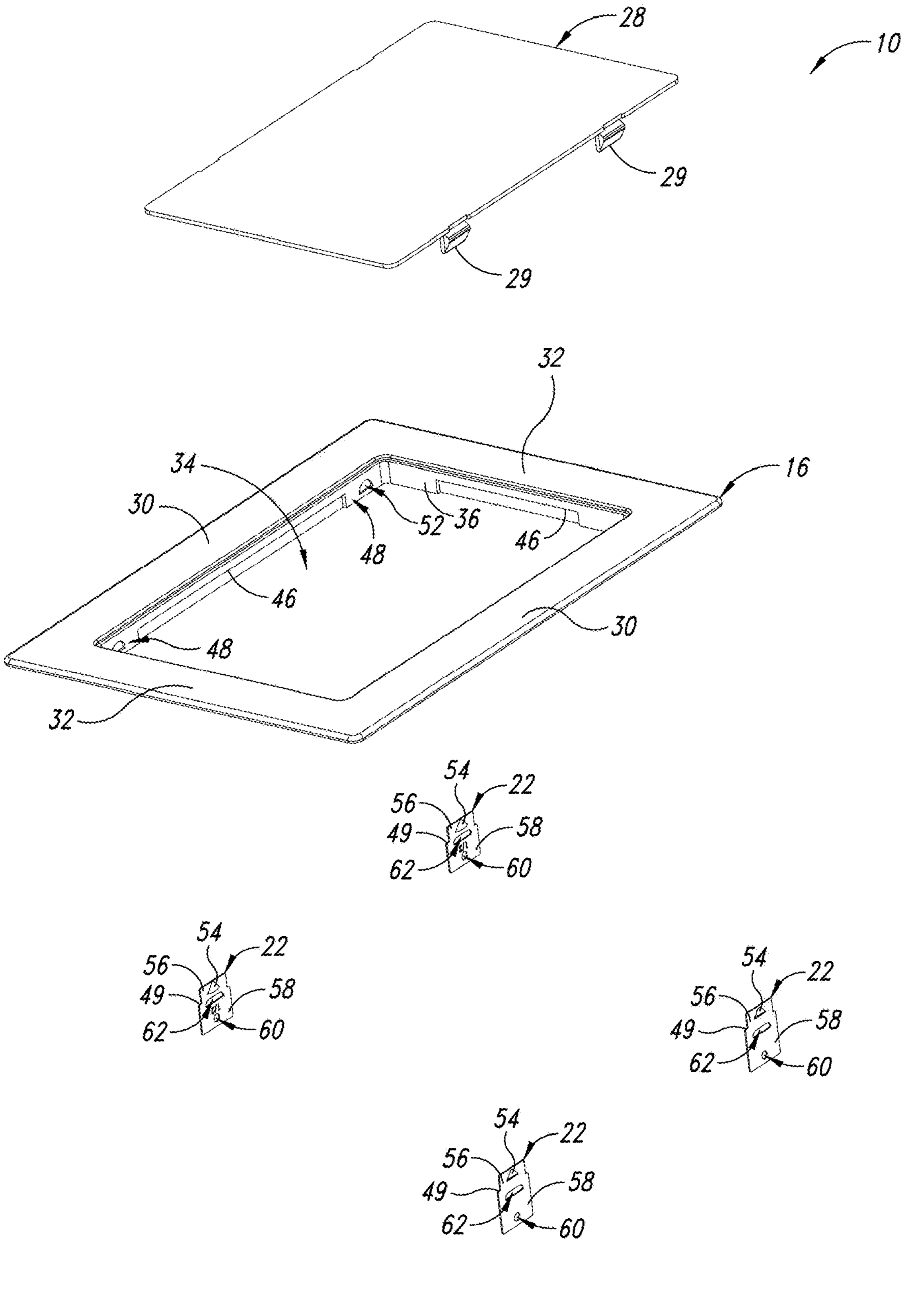
FIG. 3 is an exploded view of the assembly of FIG. 1.
Figure 4:
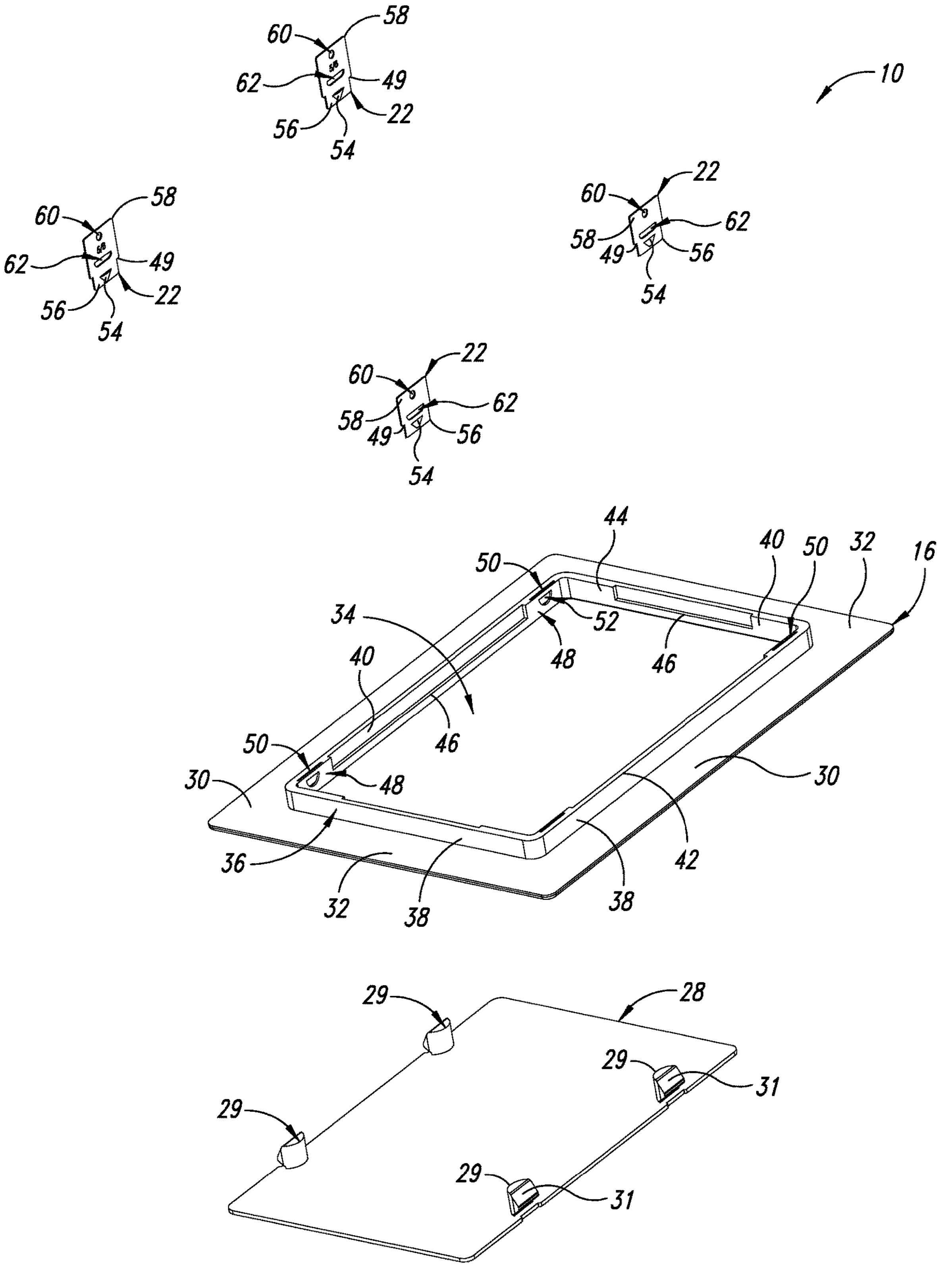
FIG. 4 is an exploded view of the reverse side of the assembly shown in FIG. 2.
Figure 5:
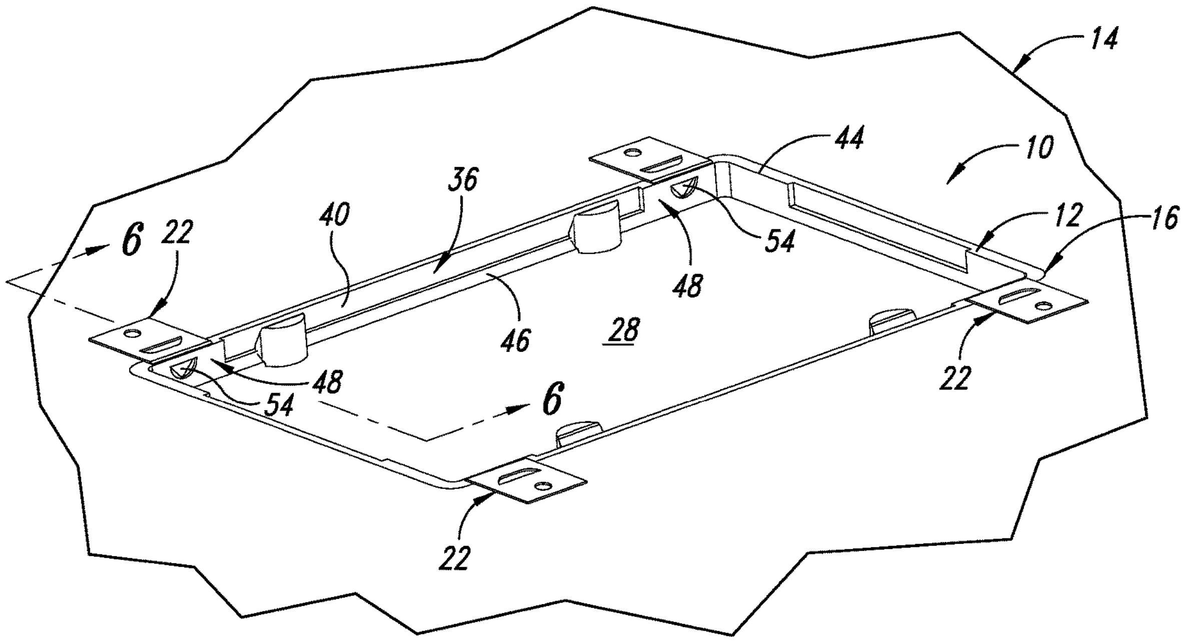
FIG. 5 is an illustration of the assembly of FIG. 1 installed in a ceiling opening in accordance with the present disclosure.
Figure 6:
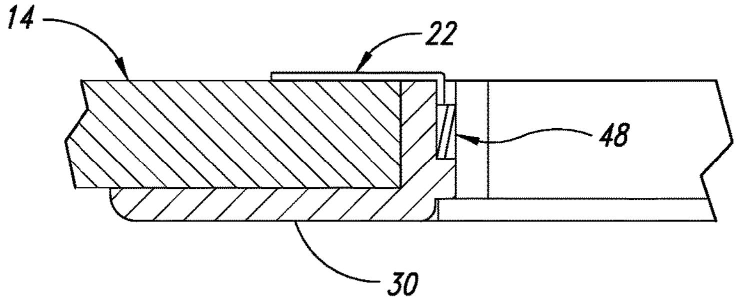
FIG. 6 is a partial cross-sectional illustration of the installed assembly shown in FIG. 5.

Referring to FIGS. 1-4, shown therein is an assembly 10 in relation to an opening 12 formed in a structural member, in this case a ceiling 14. The assembly 10 includes a frame 16 having at least two orifices 50 formed therein, a cover 28 structured for attachment to the frame 16, and at least two mounting members in the form of mounting tabs 22 capable of being attached to the frame 16. Each mounting member 22 has a first end 56 structured to be received in a respective orifice 18 in the frame 16. Each mounting member 22 is formed of a bendable material as described below, that enables a second end 58 of the mounting member 22 to bend at least 90 degrees to a bent shape, and to retain the bent shape, as shown in FIGS. 5 and 6. As such the mounting member 22 is in the form of a compliant mounting tab 22 that bends and retains its bent shape. The cover 28 attaches to the frame 16 by snapping into place as described in more detail below.

The frame 16 in this implementation has a substantially rectangular shape with two long sides 30 connected together by two short sides 32. A central opening 34 is formed in the middle of the frame 16 that is defined by the long and short sides 30, 32 that also has a rectangular shape. Ideally the central opening 34 is slightly smaller than the perimeter of the frame 16. The central opening 34 is circumscribed by an upstanding wall 36 that extends completely around the central opening 34. It is to be understood that the upstanding wall 36 does not need to fully extend around the entire perimeter of the central opening. The wall 36 is positioned on the edge of the central opening and has an outward facing wall surface 38 that is substantially smooth on all sides of the upstanding wall. The upstanding wall 36 also has an inward facing wall surface 40 on all sides of the upstanding wall 36.

It will be appreciated that the upstanding wall 36 has two long sides 42 and two short sides 44 similar to the long and short sides 30, 32 of the frame 16. Both the inward facing wall surface 40 of the long and short sides 42, 44, respectively, of the upstanding wall 36 have a ledge 46 formed thereon for retaining the cover 28 in place. More particularly, the cover 28 includes prongs 29, two on each long edge, that includes a lip 31 sized and shaped to engage the ledge 46 when the cover 28 is snapped into placed in the frame 16, thus holding the cover 28 in place but allowing it to be removed, such as with a flat tool.

In addition, the inward facing wall surface 40 on each long side 42 of the upstanding wall 36 has a mounting block 48 formed thereon and positioned adjacent the short sides 44. Each mounting block 48 has an orifice 50 formed in the top thereof that is sized and shaped to receive a single mounting member, such as the mounting tab 22 shown therein, preferably by press fitting. However, an opening 52 is formed in a sidewall of each mounting block 48 to accommodate a bayonet style retainer 54 on a first end 56 of the respective mounting tab 22.

Each mounting tab 22 has a second end 58 that includes a through-opening 60 for a fastener, if desired, and an elongated opening 62 formed transversely across the mounting tab 22 to facilitate forming a bend line.

In use, the mounting members 22 are installed in the frame 16, either at the factory or on site, by pressing each mounting tab 22 into a respective orifice 50 in the mounting block 48 until a shoulder 49 on the mounting tab 22 is seated fully against the mounting block 48 and the bayonet 54 locks into the opening 52 in the mounting block 48.

The frame 16 is then positioned into the pre-formed opening 12 by sliding the upstanding wall 36 therein. Once the frame 16 sides 30, 32 are pressed against the structure 14, the mounting members 22 are bent along the oblong opening 62 to bear against an adjacent surface of the structure 14. If the structure 14 were a ceiling, the second end 58 of the mounting tab 22 would be bent to approximately a 90 degree angle until it bears against an upper surface of the ceiling. Ideally the mounting tab 22 is formed of a malleable material that enables repeated bending without failure and keeps the mounting tab 22 at the bent position. Suitable materials include aluminum and related alloys as well as other malleable and compliant metals.

After the frame is held in position by the mounting members 22, fasteners may be inserted through the through-openings 60 and into the structure 14 to permanently mount the frame in place.

The cover 28 is then placed in the central opening 34 of the frame and pushed into place until it is seated on a circumscribing shoulder formed in the frame adjacent a surface of the frame that will be exposed when mounted on the structure 14. Seating the cover 28 in the frame will result in the lips 31 of the prongs 29 snapping in place over the ledge 46 formed on the side 40 of the upstanding wall 36.

Although the disclosure has been described in detail with particular reference to these preferred implementations, other implementations can achieve the same results.

The various implementations described above can be combined to provide further implementations. Aspects of the implementations can be modified, if necessary to employ concepts of the various patents, applications and publications to provide yet further implementations.

These and other changes can be made to the implementations in light of the above-detailed description. In general, in the following claims, the terms used should not be construed to limit the claims to the specific implementations disclosed in the specification and the claims, but should be construed to include all possible implementations along with the full scope of equivalents to which such claims are entitled. Accordingly, the claims are not limited by the disclosure.

The invention claimed is:

1. An assembly for covering an opening in a structural member, the assembly comprising:

a frame having at least two orifices formed in the frame;

a cover structured for attachment to the frame; and at least two mounting members capable of being attached to the frame, each mounting member having a first end structured to be received in a respective orifice in the frame, each mounting member formed of a bendable material that enables a second end of the mounting member to bend at least 90 degrees to a bent shape and to retain the bent shape, wherein a central opening is formed in the middle of the frame and circumscribed by an upstanding wall that extends around the central opening, and wherein each of the at least two orifices are formed in the upstanding wall.

2. The assembly of claim 1 wherein the at least two mounting members are formed of a metal material.

3. The assembly of claim 2 wherein the frame and the cover are each formed from a metal material, or wherein the frame and the cover are each formed from a non-metal material.

4. The assembly of claim 1 wherein each mounting member of the at least two mounting members has a bayonet formed on the first end to retain the at least two mounting members in engagement with the orifice in the frame.

5. The assembly of claim 1 wherein each mounting member of the at least two mounting members is press fit into the respective orifice in the frame.

6. The assembly of claim 5 wherein the first end of each of the at least two mounting members includes a bayonet structured to retain the mounting member in engagement with the respective orifice in the frame.

7. The assembly of claim 1 wherein the second end of each mounting member of the at least two mounting members has a through-opening through which may be inserted a fastener.

8. The assembly of claim 1 wherein the upstanding wall has an inward facing wall surface that has at least two mounting blocks formed thereon, wherein each of the at least two orifices are formed, respectively, in the at least two mounting blocks.

9. The assembly of claim 8 wherein each of the at least two mounting members include a shoulder that becomes fully seated against the respective mounting block when the respective mounting member is received in the at least two orifices.

10. The assembly of claim 1 wherein the cover includes an edge on which is formed a prong that includes a lip sized and shaped to engage a ledge formed on the inward facing wall surface of the upstanding wall.

11. The assembly of claim 1 wherein the at least two mounting members include an elongated opening formed transversely across the at least two mounting members to facilitate bending.

12. The assembly of claim 11 wherein the elongated opening divides the first end of the at least two mounting members from the second end thereof, wherein the first end of each of the at least two mounting members includes a bayonet structured to retain the mounting member in engagement with the respective orifice in the frame and the second end of each of the at least two mounting members includes a through-opening through which may be inserted a fastener.

13. The assembly of claim 1, wherein a first orifice of the at least two orifices is formed in the upstanding wall on a first side of the central opening and a second orifice of the at least two orifices is formed in the upstanding wall on a second side of the central opening, the second side of the central opening opposing the first side of the central opening.

14. The assembly of claim 1, wherein the upstanding wall of the frame is configured to fix the frame in the opening in the structural member in a first dimension, and wherein one or more orifices of the at least two orifices is formed in the upstanding wall on a first side of the central opening, the first side of the central opening being adjacent to the central opening in the first dimension.

15. An assembly for covering an opening in a structural member, the assembly comprising:

a frame having at least two orifices formed in the frame;

a central opening formed in the middle of the frame and circumscribed by an upstanding wall that extends around the central opening, the upstanding wall having an inward facing wall surface that has at least two mounting blocks formed thereon, wherein each of the at least two orifices are formed, respectively, in the at least two mounting blocks;

a cover structured for attachment to the frame, the cover further including an edge on which is formed a prong that includes a lip sized and shaped to engage a ledge formed on the inward facing wall surface of the upstanding wall;

at least two mounting members capable of being attached to the frame, each mounting member having a first end structured to be received in a respective orifice in the frame and including a bayonet structured to retain the mounting member in engagement with the respective orifice in the frame;

a second end including a through-opening through which may be inserted a fastener;

an elongated opening formed transversely across the mounting tab to facilitate bending, wherein the elongated opening divides the first end of the mounting member from the second end thereof;

wherein each mounting member is formed of a bendable material that enables the second end of the mounting member to bend at least 90 degrees to a bent shape and to retain the bent shape.

16. The assembly of claim 15, wherein a first orifice of the at least two orifices is formed in the upstanding wall on a first side of the central opening and a second orifice of the at least two orifices is formed in the upstanding wall on a second side of the central opening, the second side of the central opening opposing the first side of the central opening.

17. The assembly of claim 15, wherein the upstanding wall of the frame is configured to fix the frame in the opening in the structural member in a first dimension, and wherein one or more orifices of the at least two orifices is formed in the upstanding wall on a first side of the central opening, the first side of the central opening being adjacent to the central opening in the first dimension.

* * * * *